(12) United States Patent
Hermodsson

(10) Patent No.: US 6,399,014 B1
(45) Date of Patent: *Jun. 4, 2002

(54) PACKAGING CONTAINER AND A METHOD OF PRODUCING A PACKAGING CONTAINER

(75) Inventor: Göran Hermodsson, Staffanstorp (SE)

(73) Assignee: Tetra Laval Holdings & Finance S.A., Pully (CH)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,359

(22) PCT Filed: Nov. 28, 1997

(86) PCT No.: PCT/SE97/01997
§ 371 (c)(1),
(2), (4) Date: Jul. 9, 1999

(87) PCT Pub. No.: WO98/32666
PCT Pub. Date: Jul. 30, 1998

(30) Foreign Application Priority Data

Jan. 29, 1997 (SE) .............................................. 9700259

(51) Int. Cl.⁷ .............................................. B29C 49/04
(52) U.S. Cl. .................. 264/515; 53/561; 215/12.1; 220/613; 264/512; 264/527
(58) Field of Search ................. 156/244.11, 244.24, 156/292, 293, 294, 218; 264/515, 527, 540; 220/612, 613, 680, 678; 215/12.1, 12.2; 229/4.5, 5.5, 5.8

(56) References Cited

U.S. PATENT DOCUMENTS

| | | | | |
|---|---|---|---|---|
| 3,328,498 A | * | 6/1967 | Cheney | 264/527 X |
| 3,660,194 A | * | 5/1972 | Hoffmann et al. | 156/191 |
| 3,690,088 A | | 9/1972 | Anderson et al. | |
| 3,935,968 A | | 2/1976 | Rausing | |
| 3,980,744 A | * | 9/1976 | Cogswell | 264/96 |
| 4,392,576 A | * | 7/1983 | Berger et al. | 215/12.2 |
| 4,464,106 A | * | 8/1984 | Jakobsen et al. | 425/525 |
| 4,604,307 A | * | 8/1986 | Spreeuwers | 428/35 |
| 4,757,936 A | * | 7/1988 | Homma et al. | 229/5.5 |
| 4,816,093 A | * | 3/1989 | Robbins, III | 156/69 |
| 4,948,641 A | * | 8/1990 | Shantz et al. | 215/12.1 X |
| 4,997,661 A | * | 3/1991 | Kromer et al. | 229/4.5 X |
| 5,263,606 A | * | 11/1993 | Dutt et al. | 220/613 |

FOREIGN PATENT DOCUMENTS

| | | |
|---|---|---|
| DE | 2752416 | 6/1978 |
| EP | 0 108 166 | 5/1984 |
| FR | 1220563 | 5/1960 |
| GB | 2132978 | 7/1984 |

* cited by examiner

Primary Examiner—Stephen K. Cronin
Assistant Examiner—Joseph C. Merek
(74) Attorney, Agent, or Firm—Burns, Doane, Swecker & Mathis, L.L.P.

(57) ABSTRACT

The disclosure relates to a packaging container and a method of producing a packaging container for liquid contents. The packaging container has a casing (2) produced from a web-shaped multilayer material and in the form of a sleeve, which, at one end, is connected to a bottom portion (4) and at the other end is connected to a top portion (3) produced from blow moulded thermoplastic material. The casing (2) is formed by winding of the multilayer material into sleeve form and liquid-tight sealing of the material edges to a joint seam (9) extending longitudinally of the sleeve, the top portion (3) being manufactured in that thermoplastic material is extruded to form a hose (15) which is blow moulded into continuous top portions which are separated from one another and connected to the sleeve.

4 Claims, 1 Drawing Sheet

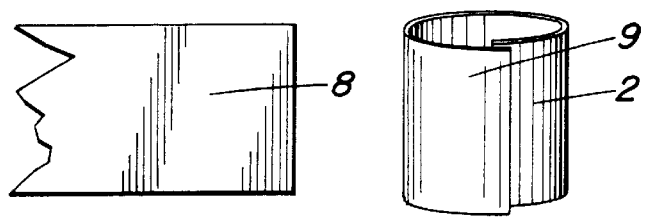
Fig. 1
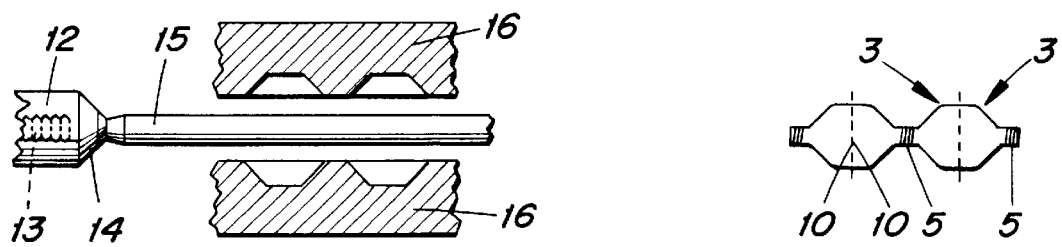
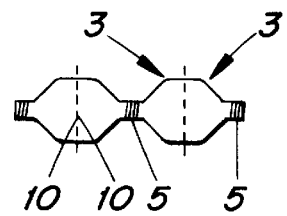
Fig. 2
Fig. 3
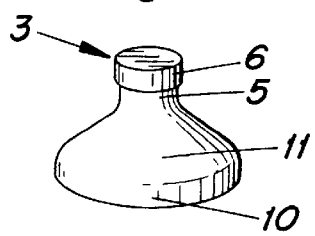
Fig. 4
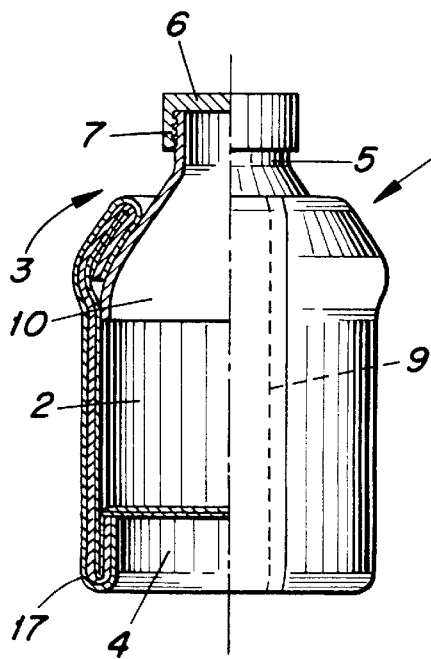
Fig. 5
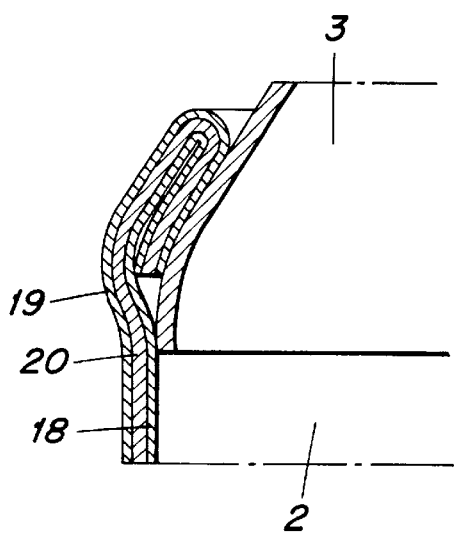
Fig. 6

PACKAGING CONTAINER AND A METHOD OF PRODUCING A PACKAGING CONTAINER

TECHNICAL FIELD

The present invention relates to a packaging container for liquid contents, and comprising a casing and a top portion. The present invention also relates to a method of producing a packaging container for liquid contents, and comprising a casing and a top portion.

BACKGROUND ART

Beverage packages for drinks of different types, for example fruit juices, sports drinks or other non-carbonated drinks occur on the market in a plurality of different forms. Plastic packages, for example blow moulded bottles or deep drawn beakers or cans are common on the market. Packages of laminated paper/plastic laminate as well as deep drawn aluminium cans are also common. A cost-effective packaging container presupposes low production costs, high production output rates (mass production) and an expedient choice of materials. The material type(s) of the package should be selected such that the properties of the material are adapted not only to the beverage which is to be packed, but also to the package type and its use. The properties of the material as regards, for example, mechanical durability, liquid-tightness and gas barrier properties should, in other words, be selected such that the material combination as a whole is not over-qualified in relation to its purpose, which, for example, might probably be considered the case when a deep drawn aluminium can is employed for non-carbonated products, since its mechanical durability is greatly over dimensioned and the desired barrier properties can be obtained with but an extremely thin layer of aluminium, or other barrier material. Deep drawn plastic bottles are also normally over dimensioned from the point of view of mechanical strength in the packing of so-called still drinks, and it may generally be ascertained that it is usual that precisely still drinks are often packed in far too exclusive and expensive packaging containers.

An optimum packaging container which is particularly intended for still drinks and which is also sterilisable and thereby suitable for aseptic packing of drinks is made up of several parts, e.g. a casing, a top portion and a bottom portion, as well as a closure arrangement, each one of these being adapted to its given purpose in view of material selection and method of production. By utilising a separate top portion, this may, for example, be made from stronger or mechanically more stable material so that application and handling of the closure arrangement can take place without the risk of damage to the packaging container itself.

It is known in the art to produce packaging containers or parts therefor, for example top or bottom portions, from different types of plastic materials which are formed by various, per se known techniques for the forming of thermoplastic. The top portion often includes a closure arrangement or threads for screw caps, which increases the demands on production method and plastic quality for this particular part. For example, it is known to produce tops for packaging containers by injection moulding, which gives a high degree of accuracy and quality but impedes or renders impossible the production of tops with an integrated gas barrier layer, which, for example, is desirable in the packing of fruit juices. Another known forming technique is conventional thermoforming of web-shaped, heated material which may, in itself, include an integrated barrier layer. However, this method gives, in an unfavourable manner, varying material thicknesses and a poorer degree of accuracy for the various parts, which has a negative effect on the possibility of forming with sufficient precision a neck portion with threads or other mechanical engagement regions for a closure arrangement.

A further, per se known technique for producing packaging containers is blow moulding, in which process the starting material is preferably a freshly extruded plastic hose which, in itself may include an integrated barrier layer of a suitable, per se known barrier plastic. With the aid of mould halves surrounding the plastic hose, and suitable pressure difference, the plastic hose may be given the desired packaging configuration. As has been mentioned above, the packaging container may, in this instance, include a barrier layer, and the method also makes it possible to manufacture the packaging container with a high degree of accuracy also as regards, for instance, a threaded neck region, but the method suffers from the decisive drawback in the fact that it is comparatively slow, both in extrusion of the requisite hose length for realising the packaging container, and in the cooling of the packaging container formed from the hose, since the packaging container must remain in the mould halves until its temperature has fallen such that the material has become geometrically stable. The large and unevenly distributed plastic volume not only delays the cooling process, but also entails an uneven cooling effect and, since positive cooling in practice is not applicable, this method must be deemed far too slow for the modern, high capacity production of packaging containers.

Another prior art packaging container which is employed for packing, for instance, juices or other still drinks is the parallelepipedic packaging container which is produced by folding and thermosealing of laminated material, which includes layers of fibre, thermoplastic and, where applicable, also a barrier layer, for example aluminium foil. While this package may be produced in a rational and material-saving manner, it has limited forming possibilities, as well as reduced possibilities to be provided with a reclosable opening arrangement.

There is thus a general need in the packaging industry to realise a packaging container and a production technique that together make it possible to produce packaging containers for non-pressurized, so-called still, products, the packaging container offering a wide range of freedom of form and optimum material composition (which, when necessary, may include a barrier layer), and also makes it possible to produce packaging containers both rapidly and with great precision.

OBJECTS OF THE INVENTION—THE CONTAINER

One object of the present invention is thus to realise a packaging container which possesses such material composition and make-up that it obviates the above-outlined drawbacks and obtains the desired properties both as regards mechanical strength, production accuracy and barrier capabilities.

A further object of the present invention is to realise a packaging container which, by an adapted choice of materials, reduces production time and material costs per unit to a minimum, without relinquishing any standards on stability and tightness.

Yet a further object of the present invention is to realise a packaging container which, in its entirety, includes layers of gas barrier material.

Still a further object of the present invention is to realise a packaging container which includes a top portion designed for cooperation with a closure arrangement.

SOLUTION

The above and other objects have been attained according to the present invention in that a packaging container for liquid contents, comprising a casing and a top portion, has been given the characterizing feature that the casing includes a web-shaped multilayer material which is in the form of a sleeve provided with a liquid-tight longitudinal joint seam, the sleeve being, at its one end, connected to a bottom portion in liquid-tight fashion and, at its other end, is connected in liquid-tight fashion to the top portion produced from blow moulded thermoplastic material.

Preferred embodiments of the packaging container according to the present invention have further been given the characterizing features as set forth in appended subclaims 2 to 5.

ADVANTAGES

By designing the packaging container according to the invention in several parts in which each part has been given an optimum material composition, the packaging container will, as regards strength and tightness, be of optimum construction, at the same time as it is eminently suited for high capacity production.

OBJECTS OF THE INVENTION—THE METHOD

There is also a general need in the art to realise a method of producing a packaging container, the method making it possible, in a rational manner and at high capacity, to produce packaging containers for still drinks.

Hence, the present invention further has for its object to realise a method of producing a packaging container, the method making it possible to produce a multi-part packaging container by separate, optimum production of the various parts and subsequent combining of the parts into a finished, liquid-tight packaging container.

Yet a further object of the present invention is to realise a method of producing a packaging container, the method making it possible rapidly and efficiently and with minimum material consumption, to produce complete packaging containers.

Still a further object of the present invention is to realise a method of producing a packaging container, the method being rapid and economical in terms of resources, and as a result, not suffering from the drawbacks inherent in prior art production methods, such as, for example, slow output rate, insufficient forming precision and high costs.

Yet a further object of the present invention is to realise a method of producing a packaging container which makes it possible to provide the packaging container in its entirety with a layer of gas barrier material.

SOLUTION

The above and other objects have been attained according to the present invention in that a method of producing a packaging container for liquid contents, comprising a casing and a top portion, has been given the characterizing feature that the casing is formed by winding of web-shaped multilayer material to sleeve shape, whereafter the material edges are sealed to one another in a liquid-tight joint seam extending longitudinally of the sleeve, that the top portion is produced by a thermoplastic material being extruded for the formation of a hose which is subjected to a blow moulding operation and is divided into individual top portions, and that the sleeve and the top portion are connected to one another in liquid-tight fashion.

Preferred embodiments of the method according to the present invention have further been given the characterizing features as set forth in appended subclaims 7 and 8.

ADVANTAGES

As a result of the method according to the invention, it will be possible to optimise the production of the different packaging container parts in respect of both material type, material strength and gas barrier properties, at the same time as production will be rational and operate at high output capacity.

BRIEF DESCRIPTION OF THE ACCOMPANYING DRAWING

One preferred embodiment of the packaging container according to the present invention, as well as the production method according to the present invention, will now be described in greater detail hereinbelow, with particular reference to the accompanying Drawing which is schematic and shows only those details indispensable to an understanding of the invention. In the accompanying Drawing:

FIG. 1 shows the reforming of a multilayer material into sleeve shape;

FIG. 2 shows a method according to the invention of extruding a hose and reforming it into top portions;

FIG. 3 shows top portions produced in accordance with the method of FIG. 2;

FIG. 4 shows an individual top portion provided with a closure arrangement;

FIG. 5 shows, partly in section, a packaging container according to the present invention; and FIG. 6 shows, on a larger scale, a part of the packaging container of FIG. 1, in section.

DESCRIPTION OF PREFERRED EMBODIMENT

A packaging container 1 according to the present invention is illustrated in FIG. 5, from which it will be apparent how the preferred embodiment of the packaging container 1 is substantially of bottle shape and includes a central, substantially cylindrical casing portion 2, a substantially conical top portion 3 connected to one end thereof in liquid-tight fashion, and a bottom portion 4 connecting in liquid-tight fashion to the opposing end of the casing portion 2. The upper, free end of the top portion 3 is designed as a neck 5 and is provided with a closure arrangement 6 in the form of a screw cap which engages with an outer thread 7 on the neck 5.

As will be particularly apparent from FIG. 1, the casing portion 2 is manufactured from a web-shaped multilayer material or a laminate web 8 which has been transversely divided for the formation of individual blanks which have been reformed to the tubular casing portions 2 in that the vertical edges of the blank have been caused to overlap one another and have been sealed to one another in a liquid-tight longitudinal joint seam 9. The web-shaped multilayer material or laminate is preferably of the known type which is employed for the production of parallelepipedic drink packages. More precisely, the material includes a substantially central carrier or core layer of fibrous material which, preferably on either side, is surrounded by thermoplastic material, e.g. polyethylene. The material may also include a layer of barrier material, e.g. some suitable barrier plastic or aluminium foil. Since the material also includes a thermoplastic material layer outside the barrier layer, it will be possible to thermoseal the material to itself without additional material or the supply of anything other than heat and pressure. Different types of thermosealing methods are well known techniques and should, therefore, not need any detailed description in this context. While optimum strength is obtained if the longitudinal joint seam 9 is made as illustrated in FIG. 1, i.e. in the form of a lap joint in which the outer layer of the one material end is connected to the inner layer of the opposing material end, it is naturally also possible to make the longitudinal joint seam as an inside-to-inside seal. This may be advantageous from the barrier point of view, but affords poorer mechanical strength, and the choice between this and other types of seals must be made in dependence upon the desired properties of the finished product.

The top portion 3 of the packaging container 1 is illustrated in FIG. 4, from which it will be apparent how the top portion includes a lower, substantially cylindrical edge portion 10, a tapering portion 11 connecting thereto, and the neck portion 5 connecting to the free end thereof, the neck portion being similarly substantially cylindrical but being of considerably lesser diameter than the cylindrical edge portion 10 at the opposite end of the top portion 3. As will be apparent from FIG. 4, the neck 5 includes outer threads or other means for mechanical engagement with a closure device which, for example, as is apparent from FIG. 5, may be in the form of a per se conventional screw cap.

The top portion 3 is produced by extrusion and blow moulding, as is schematically illustrated in FIG. 2 from which it is apparent how an extruder 12, with the aid of an extruder screw 13 (only intimated on the Drawing), processes heated plastic material and presses it out through the nozzle 14 of the extruder for the formation of a hose 15 of formable plastic material. The hose 15 is led in between two mould halves 16 which, when they are closed together, demarcate and define a portion of the hose 15 and, by a pressure difference in a per se known manner, reform the portion into the desired configuration. A thus formed portion of the hose 15 is illustrated in FIG. 3, from which it will be apparent how the hose 15 has been reformed into a number of continuous top portions 3 which are mutually united alternatingly with the necks 5 and with the cylindrical portions 10 to one another.

It will be apparent from FIG. 5 how the bottom portion 4 of the packaging container is united to the lower end of the casing portion 2 by sealing together of the edge regions of both portions 2, 4 to one another, and by refolding for the formation of a sealing fold 17. This technique is per se known and suitable for use, since the outer material of the casing portion 2 and the outer material of the bottom portion 4 are directly thermosealable to one another, as is the case in the packaging container according to the invention, since the bottom portion 4 is manufactured from the same multilayer material as the casing.

It will be apparent from FIG. 6 how the upper end of the casing 2 is united in liquid-tight fashion to the lower end of the top portion 3, i.e. with both the cylindrical edge portion 10 of the top portion 3 and with the lower region of the conical tapering portion 11 of the top portion 3. It will further be apparent from FIG. 6 how the multilayer material of the casing 2 is built up, with an inner layer 18 of thermoplastic, an outer layer 19 of fibrous material and an interjacent layer 20 of barrier material. The barrier material may be aluminium foil or some per se known barrier plastic, and the inner layer 18 may, for instance, be polyethylene. The fibrous layer 19 may be provided with an additional outer layer of thermoplastic, and possibly also additional layers of a decorative nature, for example printing ink. In order to ensure that the seal between the casing 2 and top portion 3 is optimal, both in view of mechanical strength and in view of barrier and appearance properties, the inner thermoplastic layer 18 of the casing 2 is sealed directly to the outside of the lower, cylindrical portion of the top portion 3. By refolding of the edge region of the casing 2 located above the sealing site, the exterior of the package will have an attractive appearance, since the upper cut edge of the casing 2 is hereby rendered invisible. This is also an advantage from the point of view of mechanical strength, since a raw cut edge may easily suck up moisture on storage of the packaging container and weaken the mechanical strength of the material.

In the production of the above-described packaging container in accordance with the method according to the present invention, the different parts of the packaging container are produced separately, whereafter they are combined and connected to one another in a suitable manner. The production of the casing portion 2 takes place in a substantially conventional manner, in that the web-shaped multilayer material, in the form of a laminate web, is advanced to a per se known sleeve forming machine (not shown), where a suitable portion of the laminate web is separated and wound into a sleeve, which is provided with a liquid-tight longitudinal joint seam 9. In order to realise the refolded upper end edge of the casing portion 2 as shown in FIG. 5, a refolding takes place of its upper edge (not shown in FIG. 1) preferably prior to the reforming of the laminate web 8 into sleeve form, this edge being, in the refolded state, preferably also thermosealed to itself. However, this technique is well known in the art and will not, therefore, be described in greater detail in this context.

The production of the bottom portions 4 also takes place in a per se known manner starting from a web-shaped multilayer material of the same type as that employed for the casing portion 2. Thus, use is also made here of a laminate web from which disks of suitable diameter are punched. The outer edge regions of the disks are thereafter folded substantially 90° so as to facilitate uniting with the casing portion 2 in the sealing fold 17 illustrated in FIG. 5, which takes place partly by thermosealing in order to ensure the desired liquid-tightness, and partly by mechanical forming (folding) in order further to increase mechanical strength and to impart to the packaging container a lower, liquid-protected edge to stand on.

The production of the top portions 3 takes place with the aid of a blow moulding technique which has not previously been used for the production of top portions. This technique utilises a per se known extruder 12 which, with the aid of the extruder screw 13, presses heated plastic material through the nozzle 14 so that the hose 15 is formed. With the aid of the mould halves 16 (which are reciprocal in relation to one another), a portion of the extruded, still formable hose 15 is surrounded and enclosed between the mould halves. Through an inlet nozzle (not shown), air is supplied to the interior of the entrapped hose portion, the hose because of the thus realised pressure difference, being forced to expand so that it completely fills out the mould halves 16 and thus obtains an exterior contour and dimensions that correspond to the total inner wall contour of the mould halves 16 together. A similar blow moulding process has previously been employed for producing complete packaging containers which, like the top portions according to the present invention, may, by a coextrusion process, be provided with a barrier layer of suitable plastic material. After the forming operation, a cooling phase commences, which, because of the relatively large material quantity involved and the limited cooling possibilities, takes a relatively long time which has previously rendered rational production of complete packaging containers impossible using this method. By, however, producing in accordance with the present invention a number of top portions in each forming process step (preferably for example eight in number), the total cooling time for the top portions will be divided such that production speed is increased eight times compared with corresponding production of complete packaging containers. To some degree, the cooling phase may be accelerated by the aspiration of cold air and/or by cooling of the mould halves 16, but the decisive difference in production output speed is, to all essentials, dependent upon the fact that each blow moulding operation now produces a large number of top portions. By disposing and displacing the mould halves in a per se known manner along two endless webs, the process may be rendered continuous.

When the cooling operation has been completed and the mould halves 16 have been opened, there will thus be obtained a series of united top portions 3, as illustrated in FIG. 3. The top portions are alternatingly united with the neck portions 5 to one another, and alternatingly with the larger, cylindrical edge portions 10 to one another. Since the blow moulding technique makes possible a high degree of production precision, the necks 5 may be provided with mechanically acting devices for form-locked engagement with any type of closure arrangement, for example a screw cap. Thus, the necks 5 are provided, already in connection with the blow moulding process, with the finished, outer threads 7 which are used for form-locked engagement with the closure arrangement or the screw cap. 6

It should be observed that, while the described embodiment of the present invention relates to a packaging container with a casing portion or sleeve which is of circular cross sectional configuration, there is nothing to prevent the employment of other cross sectional configurations, for example octagonal or irregular (e.g. non-cylindrical). Naturally, the other parts of the packaging container must be adapted appropriately to the configuration of the relevant casing portion.

Since both the sleeve rolling operation, i.e. the forming of the casing portion 2 and the blow moulding operation, i.e. the forming of the top portion 3, as well as the punching operation, i.e. the forming of the bottom portion 4 may take place at relatively high speeds, it will be possible using the method according to the present invention to produce a packaging container 1 provided with barrier layer in a rational and economical manner. The utilisation of different material types for the casing portion 2/the bottom portion 4 and top portion 3, respectively, makes for the optimum use of the individual materials, both in respect of mechanical strength and in respect of barrier properties and liquid-tightness, rendering the packaging container cost effective and making it possible to optimise the production cycle as compared with earlier packaging containers which were either produced exclusively by blow moulding or exclusively by folding/thermosealing of laminate materials.

The present invention should not be considered as restricted to that described and shown on the Drawing, many modifications being conceivable without departing from the scope of the appended Claims.

What is claimed is:

1. A method of producing a packaging container for liquid contents, comprising a casing and top portion, wherein the casing is formed by winding of a web-shaped multilayer material into sleeve form, whereafter the material edges are sealed to one another in a liquid-tight joint seam extending longitudinally of the sleeve; that the top portion is produced in that thermoplastic material is extruded for the formation of a hose which is subjected to blow molding and is divided into individual top portions; and that the sleeve and the top portion are connected to one another in liquid-tight fashion and wherein the extrusion of the hose which forms the top portion is coextruded including a layer of gas barrier material.

2. The method as claimed in claim 1, wherein the sleeve and the top portion are connected to one another by thermosealing between the outside of the top portion and an inner, thermoplastic layer in the sleeve.

3. The method of claim 1, wherein said top portion is formed into a conical shape.

4. A method of producing a packaging container for liquid contents, comprising the steps of:

forming a casing of a web-shaped multilayer material into a sleeve;

sealing edges of the material to one another in a liquid-tight joint seam extending longitudinally of the sleeve;

forming a hose of thermoplastic material with a layer of gas barrier material by coextrusion;

subjecting the hose to blow molding;

forming a top portion from the blow molded hose; and connecting the top portion and sleeve to one another in liquid-tight fashion.

* * * * *